Oct. 5, 1954 G. W. LEE 2,690,758
LINE VALVE
Filed Sept. 6, 1952
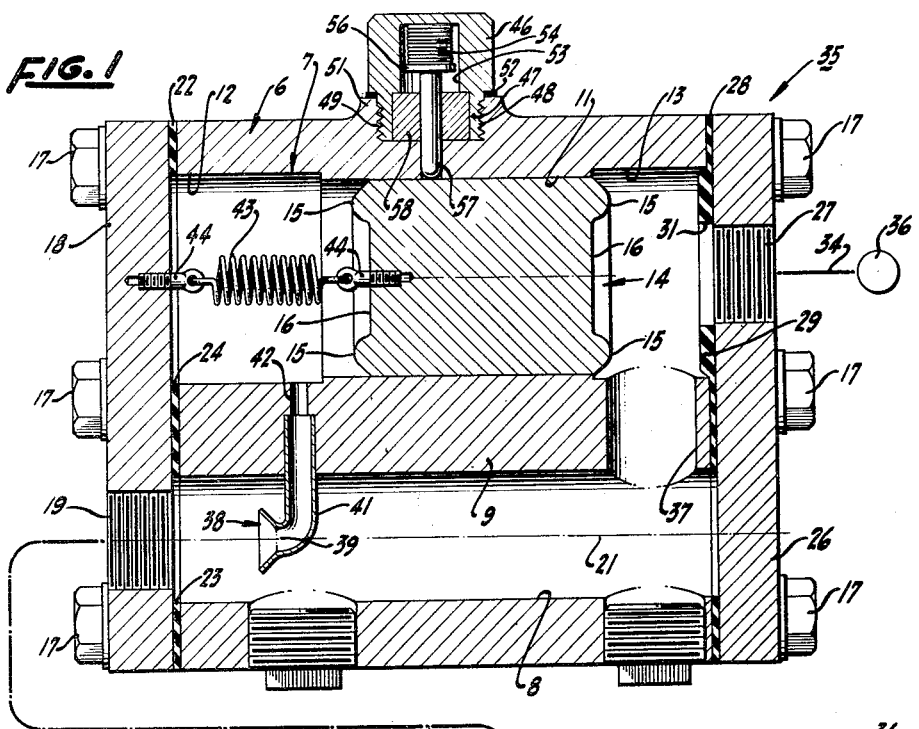
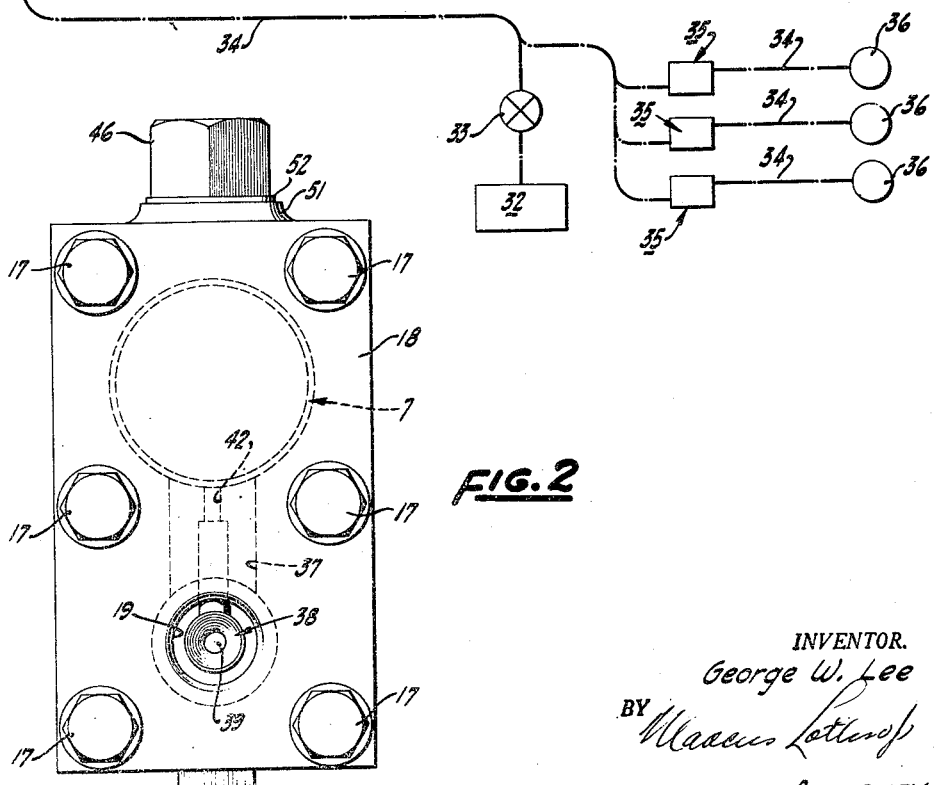
INVENTOR.
George W. Lee
BY
ATTORNEY Patented Oct. 5, 1954

2,690,758

UNITED STATES PATENT OFFICE 2,690,758

LINE VALVE

George W. Lee, Sacramento, Calif.

Application September 6, 1952, Serial No. 308,227

5 Claims. (Cl. 137—460)

The invention relates to valves especially adapted for use in automotive air brake lines.

In motor vehicle air-brake systems of the pressure type it is customary to employ a tank or reservoir having air under relatively high pressure as an actuating fluid. This fluid is conducted to brake-actuating diaphragms on each braked wheel by individual flexible hoses. Interposed between the air tank and the hoses is a control and release valve to permit the entry of the high pressure air into the hose system, at the command of the operator of the motor vehicle, and to discharge into the atmosphere the actuating air in the hose system when braking is no longer desired.

Commonly, the air hoses join to form a manifold, which, in turn, is connected to the air control and release valve. Should a rupture occur in one of the hoses upon application of the brakes, substantially all of the high pressure air from the reservoir will be diverted to the ruptured line, to be dissipated into the atmosphere. Pressure in the other lines would be deficient and the braking effect low or non-existent.

It is therefore an object of my invention to provide a valve device which is useful to prevent the loss of air pressure in an air system resulting from a rupture of one of the component air hoses.

It is also an object of my invention to provide a valve device which is adaptable for installation in either a new or existing pneumatic pressure system such as a truck braking system.

It is a further object of my invention to provide a line valve device especially suitable for installation in individual air hose-lines of a motor vehicle pressure-type air brake system.

It is still another object of my invention to provide a line valve device which comprises but few moving parts but which is able to act swiftly and positively to halt the loss of air in a ruptured air hose.

Other objects, together with the foregoing are attained in the embodiment of my invention shown in the accompanying drawing in which:

Figure 1 is a cross section along a median lengthwise plane of a line valve according to my invention, and Figure 2 is an end view of the line valve shown in Figure 1.

Formed within a valve body 6 is a cylindrical chamber 7, conveniently termed a cylinder or an upper chamber, and a lower or inlet chamber 8 or channel, separated by a central web 9. The upper chamber 7 has a centrally located circular cylindrical machined portion 11 flanked by counterbored portions 12 and 13.

Slidingly disposed within the cylindrical machined portion 11 is a piston 14 having a beaded or semi-toroidal portion 15 at each of the piston heads 16.

Fastened to one end of the valve body 6 by bolts 17 is an end plate 18 having a drilled and tapped air entry hole or port 19 centered substantially on a median axis 21 of the valve body. Interposed between the end plate 18 and the valve body is a gasket 22 having a hole 23 formed therein somewhat larger than the entry port 19, and a hole 24 substantially the diameter of the counterbore 12.

At the other end of the valve body is fastened an end plate 26 having a drilled and tapped air exit hole or port 27. A gasket 28 is interposed between the end plate 26 and the valve body 6. Upstanding from the gasket 28 is a bossed portion 29 having a diameter substantially identical to the counterbore and is of a material yieldable under the impact of the bead 15 as the piston is translated to its extreme position in preventing further escape of air through the port 27. The bossed portion 29 has a hole 31 slightly larger than the port 27 and is located substantially concentric therewith.

A typical air brake system is shown diagrammatically in Figure 1 and comprises an air pressure reservoir 32 connected to an air-brake control and release valve 33 under the control of the operator of the motor vehicle. When a braking effect is desired, the operator, by appropriate hand or foot pressure, can actuate the control valve, permitting high pressure air to flow through individual flexible hoses 34 to corresponding brake diaphragms 36 or other brake-actuating mechanisms.

On each of the hoses 34, and relatively close to the control valve 33, I interpose at least one of my line valves 35 by appropriate coupling means (not shown), entry port 19 being connected to the air reservoir or high side of the lines, and exit port 27 being connected to the air brake or low side of the line.

The control valve 33 customarily has the function not only of permitting the flow of high pressure air from the reservoir to all parts of the system, but also for releasing the air in the system when braking is no longer required. Thus, when the operator removes his foot from the brake pedal, the valve 33 closes its high pressure port and opens a port to the atmosphere, permitting the air in the hose and diaphragm system to flow in a reverse direction in the lines and to escape into the atmosphere.

In normal condition, therefore, with no brakes being actuated by the operator, the hoses and the individual line valves will be under substantially atmospheric pressure.

When the operator applies his brakes, by actuating the brake valve 33, high pressure air flows through the line 34 and enters port 19.

A portion of the air flows through the lower chamber 8 and on to the counterbore chamber 13 by means of a cross-connecting port 37 bored in the web 9, thence out through the exit port 27 and on through the brake-side of the hose 34 to the brake-actuator 36.

Another portion of the entrant air impinges on a flared tube or scoop 38 having its center substantially coincident with the center-line of the entry port 19, and facing the entry port directly so as to receive as much of the entering air as its diameter will permit. The scoop, narrowing to a throat 39, changes the velocity potential of the air to pressure potential. High pressure air is then conducted by a tube 41 attached to the web 9 and a small port 42, drilled in the web, to counterbore chamber 12 or actuating chamber.

Owing to the air compacting or compressing effect of the scoop, the air pressure in chamber 12 rapidly builds up to equal the pressure in the rest of the system, for example, the pressure in chamber 13. Thus, there is but little unbalance on the piston 14. Such unbalance as there might be, tending to drive the piston to the left in the position illustrated in Figure 1, is counteracted by a spring 43 held rigidly in position to resist compression or tension by a pair of fastenings 44 connected to the end plate 18 and the piston 14.

When the operator releases the brakes, the valve 33 permits the air in the system to escape, the air flowing in a direction opposite to that encountered when the brakes were set. Thus, the air in the brake side of the line flows through the port 27, through the cross-connecting port 37, along the lower chamber 8, around the scoop 38 and out through the port 19.

Simultaneously, air under high pressure in chamber 12 flows down the tube 41, through the scoop 38 and out the port 19.

It is necessary to relieve the pressure in chamber 12 quickly so that unbalance on the piston 14 will not result in premature closing of the piston. The spring 43 helps to prevent such closing and the inside diameter of the hole 42 is such as to permit quite rapid pressure drop in the chamber 12. Even more rapid emptying of chamber 12 is made possible, however, by reason of the low pressure created around the mouth of the scoop by the air from the lower chamber 8 moving rapidly by and around the outside of the scoop and on toward the port 19. An air-injection effect is created, helping to "suck" air out of the counterbore chamber 12.

Ruptures in the hoses ordinarily occur at a time when the air pressure in the hoses is at or near full braking pressure, that is, at the time braking is required.

When the system is in braking condition, the air pressure is high throughout and is substantially equal in all parts of the system including chambers 12 and 13, and the piston 14 is substantially in balance. Should a rupture of the hose on the brake or low-side of the valve occur, air in all portions of the system will flow toward the rupture and the pressure in various parts of the system will begin to drop.

The pressure in chamber 13 will drop very quickly owing to rapid flow through the relatively large and unrestricted port 27. The pressure in chamber 12, however, will drop much more slowly, if at all, owing not only to the smaller size of the orifice 42, but to the pressure-increasing tendency in the tube 41 caused by the compacting effect of the scoop acting upon a portion of the air rushing from the other parts of the system and through the entry port 19 toward the rupture. The pressure in chamber 12 therefore remains high, while the pressure in chamber 13 rapidly falls.

Very quickly, then, a state of unbalance on the ends of the piston 14 results, the pressure differential being so great as to overcome the effect of the spring 43 which acts now in tension, and to drive the beaded portion 15 into tight contact with the resilient boss 29, thereby preventing further flow of air not only through cross-port 37 but out exit port 27 as well.

In the usual system, the piston will remain in this position, preventing further loss of air, until the brakes are released, and until such time as the pressure in the chamber 12 drops to an amount sufficient for the spring 43 to return the piston to its usual central location.

In the ordinary case, the operator would at this time be aware of the hose rupture and be able to take steps toward its repair.

Should on-the-spot repair be not feasible, or inconvenient at the time, I provide means for locking the piston in its extreme or "closed" position. A cap nut 46 has an annular portion 47 provided with external threads 48 engaging corresponding threads in a drilled and tapped hole 49 in a boss 51 affixed to the valve body 6. A gasket 52 prevents the escape of high pressure air from inside the valve.

Within a hollowed-out portion 53 of the nut 46 I provide a compression spring 54 bearing upon a plate 56 surmounting a pin 57 whose other end bears against the wall of the piston 14 while the piston is in its usual substantially central location. When air-pressure differential resulting from a ruptured hose drives the piston to its extreme or closed position, the pin is urged downwardly and behind the toroidal bead 15, locking the piston in its closed position, preventing the further flow of air through the cross-port 37 and out port 27 into the ruptured line. The pin is allowed to project a distance determined by the amount of clearance between the underside of the plate 56 and a spacer block 58 located within the cavity bounded by the annular ring 47.

When it becomes convenient to repair the ruptured hose, the piston can be returned to its usual central position by backing off the cap nut and lifting the plate 56 and its attached pin 57, thus permitting the spring 43 to pull the piston back to its regular position. The spring 54 and the nut 46 can then be replaced, thus returning the valve to its initial operative status.

What is claimed is:

1. A valve for use in a pressure type air brake system comprising a body having an inlet port for connection with an air pressure reservoir and control and release valve, a chamber connecting with said inlet port, an outlet port, a cylinder connecting with said outlet port, and a pair of dissimilar apertures connecting said chamber and said cylinder for the passage of air therebetween, a piston disposed in said cylinder and being translatable from a first position between said apertures to a second position covering one of said apertures and said outlet port and substantially blocking the flow of air therethrough, resilient means fastened to said piston opposing said translation, and a tube connecting with the other of said apertures said tube projecting into said chamber and having a scoop facing said inlet port to receive and compress a portion of the air entering said inlet port.

2. A line valve comprising a body having a chamber therein and having a cylinder therein, there being a passage of small diameter interconnecting said chamber and said cylinder adjacent one end of said cylinder and there being a passage of large diameter interconnecting said chamber and said cylinder adjacent the other end of said cylinder, a piston translatable in said cylinder between a first location between said passages and a second location at said other end of said cylinder, means for opposing translation of said piston from said first location to said second location a first end plate on said body having a first port therein opening into said other end of said cylinder in a position covered by said piston in said second location, a second end plate on said body having a second port therein opening into said chamber in a predetermined direction, and a tube having one end communicating with said small diameter passage and having the other end in the direction opposite said predetermined direction and in line with said second port.

3. A line valve comprising a valve body having an upper chamber and a lower chamber, said chambers being connected by a first passage of predetermined small diameter and by a second passage of substantially larger diameter; an inlet port connecting said lower chamber with a high pressure air reservoir and release mechanism; a scoop facing toward said inlet port and connecting with said first passage for a predetermined flow of air therethrough in a first direction corresponding to the entry of air from said reservoir through said inlet port and in a second direction corresponding to the exit of said air through said inlet port to said release mechanism; an outlet port connecting said upper chamber with an air actuated braking mechanism, said outlet port being of substantially the diameter of said inlet port and said second passage; a gasket surrounding said outlet port at one end of said upper chamber; a piston disposed in said upper chamber between said passages, one end of said piston being adjacent a chamber in communication with said first passage and the other end of said piston being adjacent said second passage, said piston being translatable by differential air pressure on opposite ends of said piston to a location of substantially air-tight engagement with said gasket; and a spring opposing the translation of said piston and yieldable under said differential air pressure.

4. A line valve comprising a valve body having an inlet port and an outlet port, means for conducting air between said ports, an actuating chamber spaced from said ports and said air conducting means, a passage connecting said actuating chamber and said air conducting means, said passage having a cross-section of a predetermined smaller area than said air conducting means, a chamber in line with said outlet port, a piston disposed in said chamber having one end facing said outlet port and the other end adjacent said actuating chamber, a scoop facing said inlet port and connecting with said actuating chamber to conduct a portion of the air entering said inlet port to said actuating chamber, said air portion being effective at a predetermined pressure differential on opposite ends of said piston to translate said piston toward said outlet port to a position covering said outlet port, means for locking said piston in said covering position, and means effective to resist said translation at differential pressures smaller than said predetermined pressure differential.

5. A line valve comprising a valve body having an inlet port and an outlet port, said ports being connected by a channel in line with said inlet port and by a first passage of predetermined diameter, a cylindrical chamber in line with said outlet port, a piston slidably disposed in said cylindrical chamber and defining in a first substantially central position in said chamber an actuating chamber separated from said outlet port and said first passage, a second passage of predetermined smaller diameter connecting said actuating chamber with said channel, a scoop connecting with said second passage and projecting into said channel, said scoop facing said inlet port and being flared in the direction of said inlet port to receive and conduct to said actuating chamber a portion of the air entering said channel from said inlet port and to withdraw air from said actuating chamber during discharge of air from said channel to said inlet port, a spring opposing translation of said piston from said first position and yielding under predetermined differential forces of air on opposite ends of said piston to translation of said piston from said first position to a second position overlying said outlet port and said first passage, and means for locking said piston in said second position.

References Cited in the file of this patent
UNITED STATES PATENTS

| Number | Name | Date |
|---|---|---|
| 1,056,562 | Lombard | Mar. 18, 1913 |
| 1,563,143 | Bailie | Nov. 24, 1925 |
| 2,127,849 | Stone | Aug. 23, 1938 |
| 2,253,580 | Rahe | Aug. 26, 1941 |

FOREIGN PATENTS

| Number | Country | Date |
|---|---|---|
| 849,890 | France | Dec. 4, 1939 |